April 25, 1967 W. H. HILL 3,316,383
VARIABLE FORCE WELD HEAD

Filed July 20, 1964 3 Sheets-Sheet 1

INVENTOR.
WILLIAM H. HILL,
BY Walter R. Thiel
ATTORNEY.

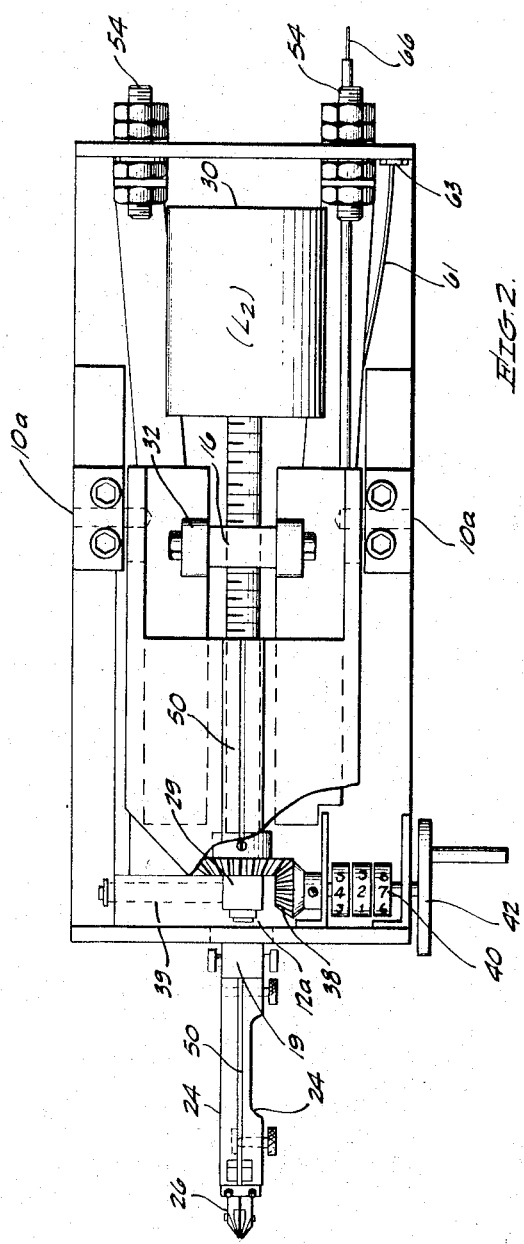

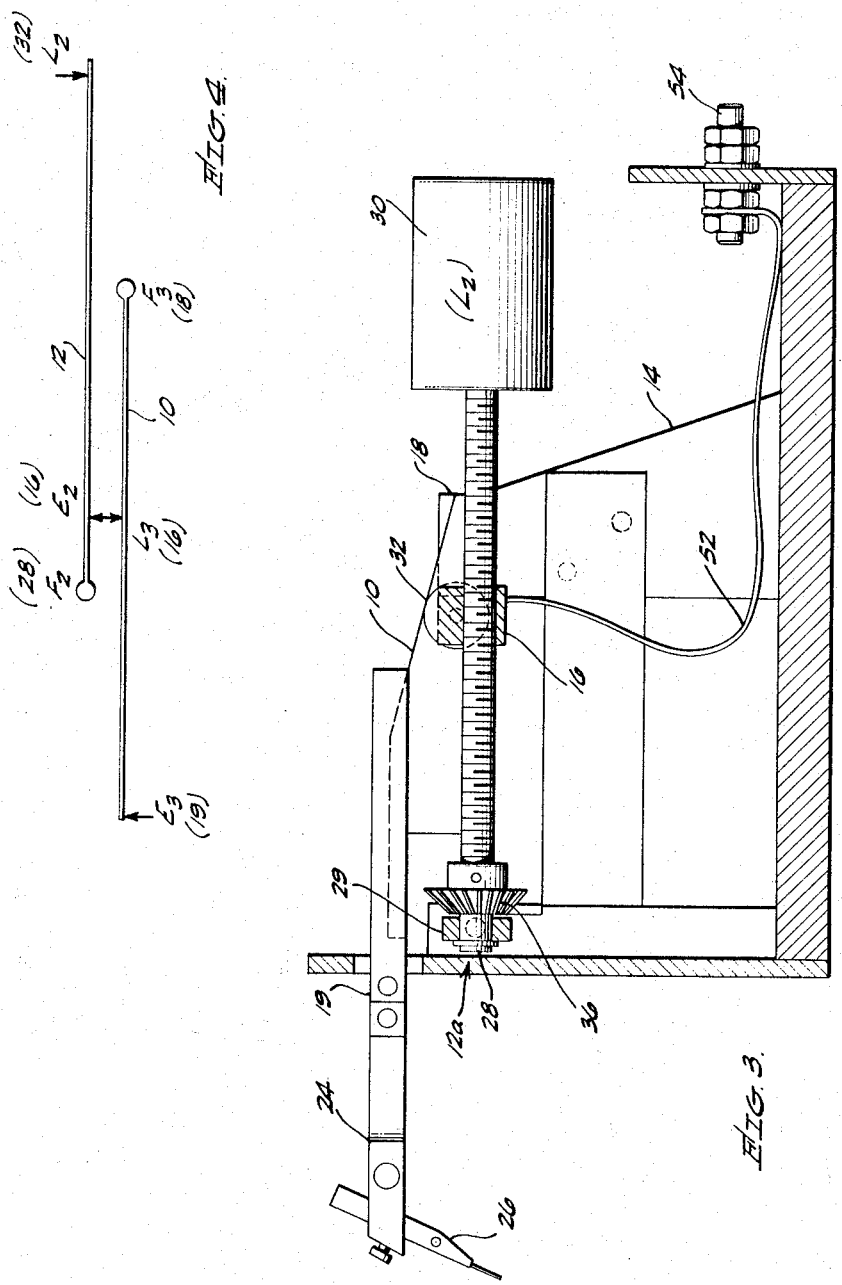

3,316,383
VARIABLE FORCE WELD HEAD
William H. Hill, Carlsbad, Calif., assignor to Hughes Aircraft Company, Culver City, Calif., a corporation of Delaware
Filed July 20, 1964, Ser. No. 383,828
5 Claims. (Cl. 219—86)

ABSTRACT OF THE DISCLOSURE

A precision weld head for series welding where the force applied to the workpiece by the electrodes is precisely controllable through an arrangement of levers.

---

This invention relates to a device for resistance welding and more particularly to a precision weld head for series welding operations where both of the electrodes are applied to the same side of one of the workpieces and having a control mechanism for accurately and precisely controlling the force applied by the electrodes to the workpieces.

The use of integrated circuit packages and microcircuit components and assemblies has resulted in a search for precision welding equipment that may be efficiently and economically used in the production assembling of these extremely small items. While numerous weld heads of various designs are known in the prior art none of them completely fulfills these requirements.

Therefore, it is an object of the present invention to provide an improved weld head specifically designed for precision series welding operations.

It is a further object of the present invention to provide an improved weld head incorporating a control mechanism for accurately controlling through a predetermined range of magnitudes the force applied to the workpieces.

It is a still further object of the present invention to provide a relatively simple, efficient, low-cost weld head adapted for high production welding of small components and assemblies.

Briefly, the presently preferred embodiment of the improved weld head of the present invention comprises a first elongated member or lever arm adapted to support a pair of electrode assemblies at one end and to be pivoted about a support structure at the other end. Adjacent to the first lever arm a second elongated member or lever arm is pivotally supported at one end by said support structure and includes a fixed weight at the other end. Near the one end of the second lever arm and supported thereby is a bevel gear engaging a pinion gear, while intermediate the two ends of said second lever arm and engaging a threaded portion thereof is a load transmitting member or load truck. The load truck movably engages both of said lever arms, and the pinion gear is rotatably supported by a crank shaft extending from the support structure. Thus, as the crank shaft is rotated the second lever arm rotates through the operation of the gears resulting in a change in the point of engagement of the load transmitting member with the first lever arm and correspondingly a change in the magnitude of the electrode force. Also associated with the crank is a counter or indicating device for translating the position of the load transmitting member to a corresponding electrode force.

Other advantages of the invention will hereinafter become more fully apparent from the following description of the drawings which illustrate a preferred embodiment thereof, and in which:

FIGURE 2 is a plan view of the improved weld head of the present invention partly cut away to illustrate the crank shaft, gear assembly and counter;

FIGURE 3 is a longitudinal median sectional view of the improved weld head of the present invention showing the various elements supported by the second lever arm and their position relative to the first lever arm;

FIGURE 4 is a diagrammatical representation of a class 2 lever and a class 3 lever illustrating the relationship between these standard levers and the first and second lever arms of the present invention.

Figure 1:
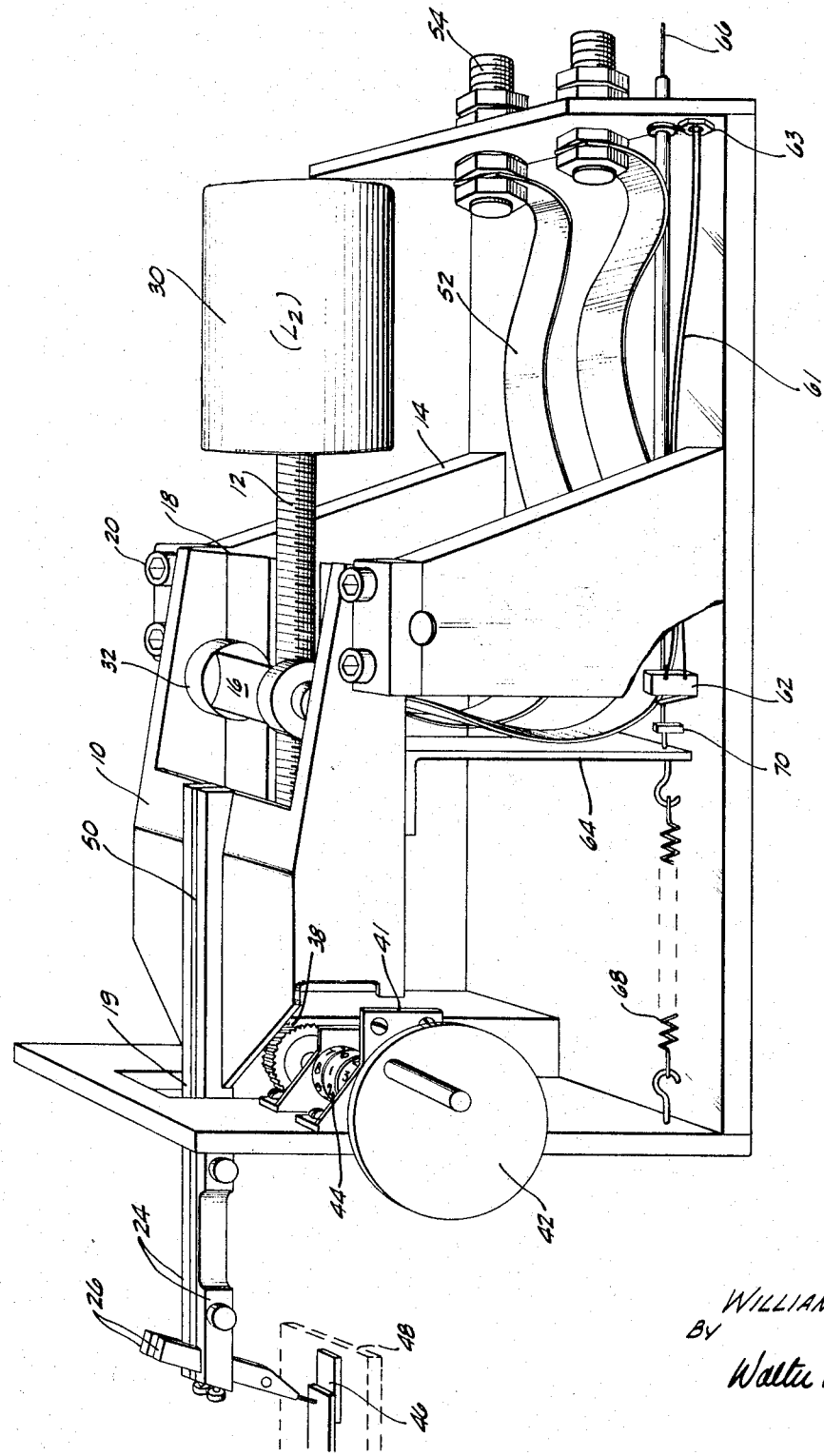
FIGURE 1 is an enlarged perspective view of the presently preferred embodiment of the improved weld head of the present invention illustrating the elements thereof and their relative positions and partly cut away to show one location for the weld energy actuating switch.

Referring now to the figures, the present invention includes a first and a second lever arm 10, 12 pivotally supported at 10a and 12a by a support structure 14 and maintained in a cooperating relationship by a load transmitting member or load truck 16. The first lever arm 10 is a class 3 lever (shown in FIG. 4) having the load between the fulcrum and effort as defined in Chamber's Technical Dictionary, Third Edition, 1958. The first lever arm 10 has a first end 18 or fulcrum $F_3$ which is pivotally supported and retained at 10a by the support structure 14 by a conventional means such as clamping blocks and screws 20 and a second end 19 or effort $E_3$. The second end 19 supports a pair of electrode holding arms 24, each including an electrode assembly 26 and defines the effort arm $F_3E_3$ of the class 3 lever. The second lever arm 12 is a class 2 lever (shown in FIG. 4) including a first end 28 fulcrum $F_2$ pivotally supported by a pivot block 29 and a second end 32 to which is secured a fixed load member or weight 30, load $L_2$, FIG. 4. This defines the load arm $F_2L_2$ of the class 2 lever. The pivot block 29 is secured to the support structure by a shaft portion inserted into a bore in the support structure while the second lever arm 12 is threaded over substantially all of its length and extends through a threaded bore in the load truck 16. The load truck 16 also includes a pair of wheels 32 of an electrical insulating material such as phenolic which rotatably engage and ride on the first lever arm 10. Thus, the load truck 16 provides the effort $E_2$ for the class 2 lever and the load $L_3$ for the class 3 lever.

By the above described arrangement of a class 2 and a class 3 lever it is easily seen that by changing the point of contact of the load truck 16 with the first lever arm 10 the length of the load arm $F_2E_2$ of the class 2 lever and the length of the effort arm $FE_3$ of the class 3 lever are changed and correspondingly changes the mechanical advantage of both levers. Thus by this simple operation the electrode force can be varied through a specific range of values depending upon the weight of load member 30, the respective lengths of the moment arms of the lever arms 10, 12 as determined by the position of the load truck 16.

In one embodiment of the present invention if the load member 30 is chosen to have a weight of .67 lb. and both of the lever arms have a length of 4.5", by varying the location of the load truck 16 the electrode force can be varied through a range of .02 to 2 lbs.

The adjustment of the electrode force is accomplished by attaching to the first end 28 of the second lever arm 12 a bevel gear 36 mated with a pinion gear 38 rotatably supported by a crank shaft 40 and crank 42 which is supported by a pair of brackets 41 secured to the support member 14. By rotating the crank 42, the pinion and bevel gears 36, 38 and the second lever arm 12 rotate, and the load truck 16 moves to vary its point of contact with the first lever arm 10 to change the mechanical advantage of the lever arrangement and correspondingly the magnitude of the electrode force.

To calibrate the electrode force for various locations of the load truck 16 a counter 44 such as a conventional rotating disc counter manufactured by Veeder-Root, Inc., is mounted to the crank shaft 40. Therefore, by measuring the electrode force for various positions of the load truck by a conventional force measuring device and by noting the counter reading for each position a chart or table may be made to indicate the precise force of the electrodes for specific indications of the counter.

Since the present embodiment of the improved weld head is adapted for series welding operations both electrodes contact the same side of a workpiece 46 typically supported on a nonconductive plate or platform 48 which may form part of the head but necessarily need not do so. In this embodiment the first lever arm 10 is constructed of two parts assembled by suitable bonding or securing means such as insulated bolts (not shown) into a single unit and separated by an electrical insulating member 50. Attached to each half of the first lever arm 10 is a conductor or strap 52 connected to a connector 54 secured to part of the support structure 14. Now, when a conventional weld energy power supply (not shown) is connected to the connectors 54 and the electrodes are brought into contact with the workpiece 46 and the welding current power supply is energized electric current will flow through the path defined by the conductors, the insulated portion of the first lever arm, the electrode arms and the workpiece to form a fused nugget or weld at the joint surface beneath the two electrodes.

To supply the weld energy, when the proper electrode force is applied, a conventional actuating device is provided in juxtaposition to the first lever arm 10. Such a device might typically be a bracket and spring mechanism which actuates a microswitch 62 coupled by suitable electrical conductors to the weld energy power supply (not shown) through a plurality of conductors 61 and a connector 63. As shown in FIG. 1 such a device might include a bracket 64 extending from the first electrode arm 10 and an actuating cable 66 passing through a bore in the bracket 64 and secured to a spring 68 fastened to the support structure 14. The spring 68 has a spring constant or stiffness sufficient to maintain during inoperativeness a stop 70 secured to the cable 66 in engagement with the bracket 64. Thus when the weld head is inoperative the spring 68 maintains a force on the bracket 64 sufficient to prevent the first lever arm 10 from rotating.' However, when the actuating cable 66 is moved sufficiently to the right as shown in FIG. 1 such as by the operation of a first pedal or hydraulic or electrical device (not shown) the stop 70 is moved from in contact with the bracket 64 and contacts the microswitch 62 substantially at the same time as the first lever arm rotates into engagement with the workpiece 46.

While one embodiment of this invention has been herein illustrated it should be appreciated by those skilled in the art that variations of the disclosed arrangement both as to its details and to the organization of such details may be made without departing from the spirit and scope thereof. Accordingly, it is intended that the foregoing disclosure made in the drawings may be considered as illustrative of the principles of this invention and not construed in a limiting sense.

What is claimed is:

1. A weld head comprising:
a support member;
a first lever arm pivotally supported at one end by said support member and adapted to retain an electrode assembly at the other end;
a second lever arm supported at one end by said support member in juxtaposition to said first member and having a fixed weight secured to the other end;
a movable coupling member engaging said second lever arm and in contact with said first lever arm; and
a motion producing means coacting with said second lever arm for producing rotation of said second lever arm about its axis to vary the point of contact of said coupling member with said first lever arm.

2. A weld head comprising:
a support member;
a first lever arm pivotally supported at one end by said support member and adapted to retain an electrode assembly at the other end;
a second lever arm including a threaded portion supported at one end by said support member in juxtaposition to said first member and having a fixed weight secured to the other end;
a movable coupling member engaging said second lever arm and adapted to travel along said threaded portion in contact with said first lever arm; and
a motion producing means coacting with said second lever arm for producing rotation of said second lever arm about its axis to vary the point of contact of said coupling member with said first lever arm.

3. A weld head comprising:
a support member;
a first lever arm pivotally supported at one end by said support member and adapted to retain an electrode assembly at the other end;
a second lever arm including a threaded portion supported at one end by said support member in juxtaposition to said first member and having a fixed weight secured to the other end;
a movable coupling member engaging said second lever arm and adapted to travel along said threaded portion in contact with said first lever arm;
a motion producing means coacting with said second lever arm for producing rotation of said second lever arm about its axis to vary the point of contact of said coupling member with said first lever arm; and
an indicating device operated by said motion producing means to indicate various positions of said coupling means relative to said lever arms.

4. A weld head comprising:
a support member;
a first lever arm pivotally supported at a first end by said support member and retaining an electrode assembly including a pair of electrodes at a second end;
a second lever arm including a threaded shaft supported at a first end adjacent to the second end of said first lever arm and extending in juxtaposition therewith to a second end formed into a fixed weight;
a load transmitting member having a threaded bore engaging the threaded shaft and a pair of insulated wheels engaging said first lever arm; and
a rotation producing means acting on said second lever arm to make it rotate about its axis and including a bevel gear supported by the second lever arm, a crank shaft rotatably attached to the support member, a pinion gear mated with said bevel gear and rotatably supported by said crank shaft, and a crank attached to said crank shaft,
whereby the rotation of said crank changes the point of engagement of said load transmitting member with said lever arms and correspondingly the weld force of the weld head.

5. A weld head comprising:
a support member;
a first lever arm pivotally supported at a first end by said support member and retaining an electrode assembly including a pair of electrodes at a second end;
a second lever arm including a threaded shaft supported at a first end adjacent to the second end of said first lever arm and extending in juxtaposition therewith to a second end formed into a fixed weight;
a load transmitting member having a threaded bore engaging the threaded shaft and a pair of insulated wheels engaging said first lever arm;

a rotation producing means acting on said second lever arm to make it rotate about its axis and including a bevel gear supported by the second lever arm, a crank shaft rotatably attached to the support member and a pinion gear mated with said bevel gear and rotatably supported by said crank shaft, and a crank attached to said crank shaft; and a counter mounted on said crank shaft and operated thereby to indicate various positions of said load transmitting member relative to said lever arms when said crank is rotated.

References Cited by the Examiner

UNITED STATES PATENTS

| | | | |
|---|---|---|---|
| 2,310,556 | 2/1943 | Strong | 219—86 X |
| 2,452,009 | 10/1948 | Woodward | 219—86 |
| 3,140,381 | 7/1964 | Nyborg | 219—86 |
| 3,207,884 | 9/1965 | Davis et al. | 219—86 X |
| 3,263,057 | 7/1966 | Conti | 219—78 |

RICHARD M. WOOD, *Primary Examiner.*

B. A. STEIN, *Assistant Examiner.*